United States Patent [19]

Himelhoch

[11] Patent Number: 4,462,156
[45] Date of Patent: Jul. 31, 1984

[54] PISTACHIO NUT OPENER

[76] Inventor: Patricia J. Himelhoch, 1024 Briarcliffe, Flint, Mich. 48504

[21] Appl. No.: 315,210

[22] Filed: Oct. 26, 1981

[51] Int. Cl.³ .............................................. A47J 23/00
[52] U.S. Cl. ................................... 30/113.2; 30/120.2
[58] Field of Search ................. 30/113.2, 120.1, 120.2, 30/120.5

[56] References Cited

U.S. PATENT DOCUMENTS

| | | | |
|---|---|---|---|
| 549,680 | 11/1895 | Morley | 30/113.2 |
| 580,563 | 4/1897 | Totten | 30/113.2 |
| 966,269 | 8/1910 | Underwood | 30/120.1 |
| 1,256,439 | 2/1918 | Clark | 30/113.2 |
| 1,455,323 | 5/1923 | Cummins | 30/113.2 |
| 1,622,309 | 3/1927 | De Forest | 30/113.2 |
| 2,130,623 | 9/1938 | Hines et al. | 30/120.1 |
| 2,461,524 | 2/1949 | Cook | 30/120.2 |
| 2,653,638 | 9/1953 | Nelson | 30/120.2 |
| 3,074,449 | 1/1963 | Mikulas | 30/120.2 |
| 3,936,934 | 2/1976 | Bowden | 30/113.2 |
| 4,068,573 | 1/1978 | Romero | 30/120.1 |
| 4,317,281 | 3/1982 | Yowa | 30/120.2 |

Primary Examiner—Frederick R. Schmidt
Assistant Examiner—J. T. Zatarga
Attorney, Agent, or Firm—Harry R. Dumont

[57] ABSTRACT

An opener for pistachio nuts which is adapted to open both nuts either with small apertures or with large longitudinal apertures. The opener device has a pointed end portion for opening the smaller slot nuts and further includes a longer longitudinal sharp end portion for inserting in a longer slot to force open the nut without damaging the kernel.

2 Claims, 6 Drawing Figures

U.S. Patent            Jul. 31, 1984            4,462,156
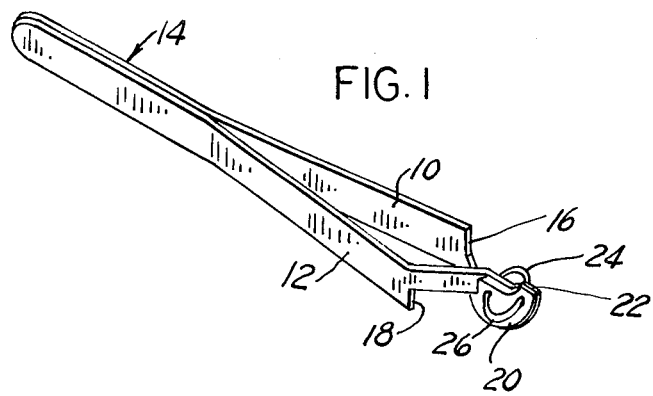
FIG. 1
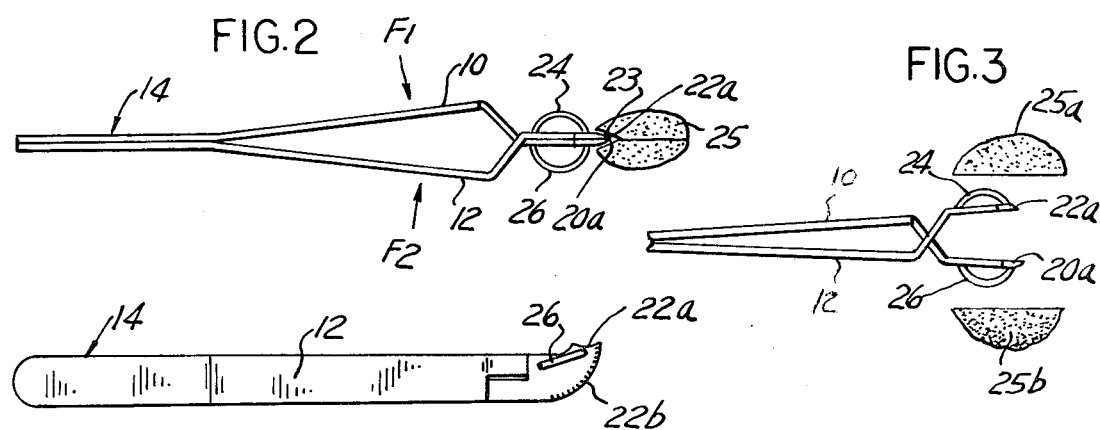
FIG. 2
FIG. 3
FIG. 4
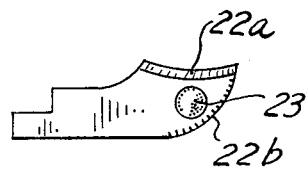
FIG. 5
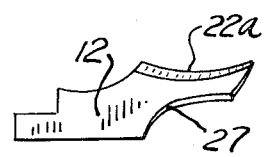
FIG. 6

PISTACHIO NUT OPENER

BACKGROUND OF THE INVENTION

The present invention relates to a hand operated opener particularly adapted to handle pistachio nuts although it is not so limited in its operation. In the preparation and roasting of pistachio nuts, openings both with small size and long size slots result. The invention according to the present concept has a configuration which will operate on nuts having either the large or small sized openings. A pair of spring biased levers are included which have at their operating ends a shoulder for limiting the initial movement of the opening ends into the nuts whereby damage to the rather fragile pistachio nuts is prevented.

A special feature present in this invention is the dual capability of entering and opening the nut either through a small or through a large opening. With this capability in mind, a small pointed end is provided for opening a small slotted nut while a complementary curved and sharpened portion is provided to open a longer slotted opening that may be present in the nut.

A number of prior art devices are known which attempt to open nuts or otherwise operate in a pivotal opening fashion to achieve a similar end result.

U.S. Pat. No. 3,074,449 was issued on Jan. 22, 1963 to W. Mikulas for "Device for Opening Nuts". The device shown and claimed in that application, however, is of a bar shaped and opening wedge configuration and it does not have the several capabilities of the present invention.

U.S. Pat. No. 1,622,309 was issued to L. C. DeForest on Mar. 29, 1927 for a "Date Pitter" which opener attempted to solve a similar problem to that handled by the present invention. The opener included a pair of pivotally operated end portions with serrated surfaces with in a different manner would tend to engage and spread open the shell halves of the device.

U.S. Pat. No. 2,472,354 was issued on June 7, 1949 to C. P. Waters for "Cocoanut Husk Removing Tool". This patent shows a device adapted to split and open a cocoanut husk in which there is provided a bumper and a pointed end portion for achieving the end result. The device is not adapted to handling nuts of the pistachio type in which there needs to be an accommodation both for small and for large nut slots in the structure of the opener.

U.S. Pat. No. 2,058,072 was issued on Oct. 20, 1936 to J. C. Fiddyment for "Nut Recracker". This patent discloses and claims a black walnut cracker adapted to provide a pivotal and serrated opening end portion opening to a nut of the walnut type.

A plurality of devices are known in the prior art for handling pivotally and resiliently contained arms which, responsive to a manual actuation, will spread or close according to the structure of the devices and either grip or spread the object to be opened.

U.S. Pat. No. 2,634,728 issued on Apr. 14, 1953 to G. T. Dale for "Hair Tweezers" is of interest with respect to this type of construction. It does not, however, have any relationship in its operation or in the end structure of it to handle with equal facility either large or small opening nuts after the manner of the present application.

SUMMARY OF THE PRESENT INVENTION

The present invention will thus be seen to provide a bias force applying opener particularly adaptable to nuts of the pistachio type in which the shell is both tough and resilient and in which the contained nut itself is exceedingly fragile. The present invention has the capability of handling this problem with an outstanding facility.

BRIEF DESCRIPTION OF THE DRAWINGS

The present invention will now be described with respect to the accompanying specification and to the drawings in which like elements are referred-to by like numerals throughout the specification and in which:

FIG. 1 is a perspective view of the invention;

FIG. 2 is a top plan view of the present invention shown in the state prior to opening a nut;

FIG. 3 is a view similar to FIG. 2 but with entry into a larger shell opening showing the completed opening operation of a nut;

FIG. 4 is a side elevational view of the device of FIG. 1 showing one embodiment of a bumper for limiting the engagement of the opener and the degree of entry to the nut along the line of FIG. 2;

FIG. 5 is a side elevational view of the end portion of the device of FIG. 4 showing a different embodiment of the shoulder portion thereof; and FIG. 6 is a still further and different embodiment of the shoulder portion shown in FIGS. 4 and 5.

DETAILED DESCRIPTION OF THE PREFERRED EMBODIMENT

FIG. 1 shows the general configuration of the nut opener which includes a pair of resilient arms 10 and 12 joined by welding, fusing or other process at their left hand ends in the area designated by the numeral 14. It will be understood that arms 10 and 12 can be formed of a resilient steel or plastic material which gives a sufficient deformation force to accomplish the objects of this invention. The arms 10 and 12 include cut-out portions 16 in arm 10 and portion 18 in arm 12 which are complementary in form to permit compression of the arrangement thus to apply the spreading of the points or end portions that will now be described with respect to their operation to open the nut.

The end portions of the arms 10, 12 include a first pointed extension 20 formed at the right hand end of the lever 12 and a second pointed extension 22 formed at the right hand end of the lever 10. A bumper device is formed from a pair of metalic loops or similar devices 24 and 26 fixed to the opposite faces of the pointed ends 20 and 22 as shown in FIG. 1. As better shown in FIG. 2, the two levers 10 and 12 upon application of forces along the lines F1 and F2 cause a separation of the pointed ends 22a and 20a which have previously been inserted into a slot 23 formed in a nut 25 which is to be opened.

The initial entry or penetration of the above mentioned pointed ends is limited by the bumpers 24, 26 which have been mounted on the faces of the opener ends. This serves to limit or prevent any possible damage to the nut during the opening process. The opening process of the device of FIG. 2 is particularly adaptable to nuts 25 having a very small opening in the end of the nut side portion.

FIG. 3 shows a different situation in which the openers are longitudinally inserted in a somewhat longer slot formed between the two nut halves 25a and 25b. In the operation according to this system, the pressure of the opening device is distributed over a relatively longer periphery of the shells 25a and 25b so there is less likelihood of fracture and breakage of the nut inside.

FIG. 3 shows the state of the nut opener just after the levers 10 and 12 have been operated to provide a spreading force to nut shell halves 25a and 25b. Once again, the distance of entry of the pointed end of the opener into the pistachio nut has been appropriately limited by the lateral bumpers 24 and 26.

FIG. 4 is of particular interest for its showing of the configuration from a side view of the loop 26 and further and, even more importantly, the configuration of the upper sharp end 22a which is actually formed complementary to the curvature of the shell of the nut in the event the opener is used along a side or larger slot opening in the nut. This particular configuration assures that an entry is achieved along a longer dimension slot in the shell when this is required particularly as shown in FIG. 3.

FIGS. 5 and 6 are of interest for their showing of two alternate embodiments with respect to the shoulder or bumper structure corresponding to loops 24, 26 of FIGS. 1 through 4 which structures appropriately limit the distance that the pointed end 22a or the lower sharpened surface 22b will enter into the nut before it is forced open.

In the showing of FIG. 5 there is shown a raised dimple or upset portion 23 that may be formed during stamping from the two side portions 10 and 12 which plays the same function as the loops 24, 26 of FIG. 2.

FIG. 6 shows a still different form of my invention in which the entry limiting portion or shoulder is formed by an up-turned ear 27 formed from the lower surface of the forward ends of the levers 10 and 12 respectively.

It will thus be seen that I have provided by my invention a nut opener particularly adapted to the handling of pistachio nuts that can accommodate the opening of pistachio nuts over a broad range of sizes from small to large with respect to the slot left in the nut after roasting.

I claim as my invention:

1. An opener for nuts comprising:
   a pair of resilient levers;
   a connecting means for joining one end of each said levers to the other;
   a pointed end portion formed at the other free end of each of said levers;
   a sharpened side portion included in each of said end portions and having a concave contour corresponding to the nut shell curvature; and
   a raised shoulder mounted on each such end portion for limiting the degree of entry of the pointed ends into the nut shell, said shoulder comprising a raised loop portion fastened to the outer surface of each such end portion.

2. An opener for nuts comprising:
   a pair of resilient levers;
   a connecting means for joining one end of each said levers to the other;
   a pointed end portion formed at the other free end of each of said levers;
   a sharpened side portion included in each of said end portions and having a concave contour corresponding to the nut shell curvature; and
   a raised shoulder mounted on each such end portion for limiting the degree of entry of the pointed ends into the nut shell, said shoulder comprising a turned-up edge of each of said end portions.

* * * * *